United States Patent [19]

Buchsel

[11] 4,408,739

[45] Oct. 11, 1983

[54] AIR TRANSPORTABLE CARGO LOADER FOR AN AIRPLANE

[75] Inventor: Christian K. E. Buchsel, Issaquah, Wash.

[73] Assignee: The Boeing Company, Seattle, Wash.

[21] Appl. No.: 221,783

[22] Filed: Dec. 31, 1980

[51] Int. Cl.³ .............................................. B64C 1/22
[52] U.S. Cl. .............................. 244/137 R; 414/343; 414/347; 414/495; 414/498
[58] Field of Search ............... 244/118.1, 118.2, 118.3, 244/129.5, 137; 414/340, 343, 347, 467, 495, 498; 280/43; 296/20

[56] References Cited

U.S. PATENT DOCUMENTS

| 3,233,767 | 2/1966 | Goodacre | 414/340 X |
| 3,972,427 | 8/1976 | Stanley | 244/137 R |
| 4,235,399 | 11/1980 | Shorey | 244/118.3 X |

*Primary Examiner*—Richard A. Schacher
*Attorney, Agent, or Firm*—Christensen, O'Connor, Johnson & Kindness

[57] ABSTRACT

An air transportable cargo loader for an airplane includes a platform body supportively coupled to articulated foldable leg assemblies at its opposite ends. The leg assemblies are independently foldable between extended positions wherein they support the respective ends of the platform at a height sufficient to serve the cargo openings of a commercial transport airplane and retracted positions wherein the leg assemblies are folded compactly against the underside of the platform body for stowage within the airplane. The cargo loader can be deployed from an airplane for loading and unloading operations without any ground-based assistance, and can be likewise loaded aboard and stowed in the airplane without assistance and further can support cargo while so stowed. The leg assemblies may be actuated synchronously to raise and lower the platform in a horizontal position in the manner of an elevator, or they may be actuated independently to position the ends of the platform at different selected heights so as to form a loading ramp. An individual cargo loader may be employed as a ramp, for example, with an airplane having a kneelable nose landing gear assembly. Alternatively, two or more of the cargo loaders may be coupled together in tandem to form a loading ramp of relatively lesser slope. The leg assemblies of the cargo loader, when retracted against the underside of the cargo loader, include substantially planar bearing pad support surfaces which enable the cargo loader to be moved while aboard an airplane on a conventional air cargo deck having cargo casters or rollers.

19 Claims, 13 Drawing Figures

AIR TRANSPORTABLE CARGO LOADER FOR AN AIRPLANE

BACKGROUND OF THE INVENTION

The present invention is related generally to cargo handling equipment and, more particularly, to cargo loaders for transport airplanes.

Large transport airplanes require special cargo handling equipment for loading and unloading of cargo. Such equipment is ordinarily ground based. That is, it is ordinarily permanently stationed at an airport and used to service airplanes passing through the airport. Such equipment is typically in the form of a vehicle supporting a conveyor belt, ramp, elevator, or other cargo handling device.

In military airlift applications and similar uses of large cargo aircraft, where little or no ground-based cargo loading equipment is available, there has been a need for an air transportable cargo loader adapted to load and unload a variety of large and small cargo items of various types ranging from wheeled and tracked motor vehicles to boxes and barrels of goods. In order to avoid need for space-consuming assist gear aboard the aircraft, and to function effectively without ground support equipment, the loader should provide its own means suiting the varying situational requirements, including adaptability to be conveniently loaded and stowed aboard the aircraft and conveniently deployed therefrom. To conserve cargo space, the stowed loader should serve to support cargo. When deployed, it should be conveniently convertible to serve as a loading ramp for wheeled vehicles or as an elevator. Wheeled, if necessary, the loader can also be used as a mobile ground vehicle to move the cargo to and from a truck or dock.

Previous air transportable loaders are mechanically complex and relatively time-consuming to deploy. For example, one previously known air transportable loader for a large commercial airplane, such as a Boeing 747 airplane, typically takes up to several hours to deploy. Other previously known air transportable loaders require support from ground-based equipment.

Another problem with previously known air transportable loaders is that they are typically capable of handling cargo in only one mode. For example, some cargo loaders are deployable to form a ramp. Other cargo loaders are deployable to operate as a crane or as an elevator. Such cargo loaders are of limited usefulness in the handling of mixed cargo, for example, cargo including motor vehicles as well as pallets and bulk containers such as barrels.

Accordingly, it is the primary object and purpose of the present invention to provide an improved air transportable cargo handling vehicle for a commercial transport airplane.

It is also an object of the present invention to provide a versatile air transportable cargo loading, unloading and ground transport vehicle that itself can be deployed from the airplane and loaded into the airplane in a matter of a few minutes and which does not for these purposes require any support from ground-based equipment or hoist equipment in the airplane.

It is another object of the present invention to provide such an air transportable cargo handling vehicle also having a leg and platform settings enabling it to serve also as a loading and unloading ramp for wheeled and tracked vehicles, and the like. More specifically, it is an object of the present invention to provide a multi-use air transportable cargo vehicle that is selectively operable either as an elevator-type loader and unloader or as a loading ramp acting separately or in tandem cooperably with one or more similar vehicles.

It is a further object of the invention to provide an air transportable cargo loader, unloader and transport vehicle steerable and self-propelled on the ground and which is capable of serving at any of differently located cargo entrances of an airplane.

It is yet another object of the present invention to provide an air transportable cargo loader that is compactly foldable so as to occupy a minimum of aircraft cabin space. More specifically, it is an object to provide such a loader vehicle that may be folded into a flat platform configuration in which it will lie stably on an airplane cargo deck to function as a slightly raised part of that deck in supporting flight cargo.

It is a further object to provide a loader that may be stacked on top of another loader inside the airplane fuselage such that several loaders can be loaded in sequence, shipped together and deployed in sequence, each serving the role of a support deck in taking on board the one succeeding it, or in discharging the one preceding it during their removal from the airplane, all without support of ground equipment or special equipment aboard the airplane.

SUMMARY OF THE INVENTION

In accordance with the present invention, a self-contained, air transportable cargo loading and unloading vehicle includes a body in the shape of a platform structure preferably of elongated rectangular proportions. Articulated foldable wheeled leg assemblies are supportively connected to the underside of the platform adjacent its opposite ends, one of which is hereinafter termed the inboard end adapted in use for disposal adjacent to or inside the airplane, and the other, the outboard end. The leg assemblies are pivotably connected to the platform for movement between extended positions wherein they depend downwardly to support the ends of the platform at selected heights and fully retracted positions wherein they lie folded compactly against and extending parallel to the underside of the platform in order that the loader may rest in this compact form on the cargo deck of an airplane and serve as a load-carrying part of that deck.

The inboard and outboard leg assemblies include independent actuating means that may be operated conjointly to obtain synchronous extension and retraction of the leg assemblies so as to raise and lower the platform in a substantially horizontal position in the manner of an elevator. In an alternative mode of use, the independent retraction and extension capability of the leg assemblies enables immediate conversion of the platform for use as a loading ramp by adjusting the ends of the platform to different heights.

The inboard leg assembly and the inboard end of the platform are adapted to enable the loader to be deployed from and loaded into an airplane without external supporting equipment and/or special hoist equipment aboard the airplane. Specifically, the inboard end is adapted such that the platform may be advanced over the cargo deck of the airplane and the inboard end lowered to bear upon the same such that the inboard leg assembly may be retracted. The loader may then be slid inwardly into the airplane with the outboard leg assembly supporting the outboard platform end until a major portion of the platform bears upon the cargo deck of the airplane to permit the outboard leg assembly to be then retracted upwardly into its folded position and the loader to be then fully drawn into the cargo hold of the airplane.

The reverse procedure is employed in deployment, wherein the loader is slid outwardly through the cargo opening until the outboard leg assembly clears the cargo deck and can be extended downwardly to bear on the ground and support the outboard end of the platform. The platform is then slid further outwardly until the inboard leg assembly clears the edge of the cargo deck and can be extended downwardly while the inboard end of the platform is supported by the cargo deck. For this purpose, the inboard leg assembly is preferably spaced from the inboard end of the loader body such that the inboard end of the loader body may bear directly on the edge of the cargo deck. With both leg assemblies thus extended, the loader may be moved away from the airplane sufficiently to permit lowering of the platform to cargo deck level or to serve as a ramp with the platform sloped. Additionally, the loader may be moved to serve in its various operating modes at any of the cargo openings of the airplane and may also be used as a ground transport vehicle to carry cargo to and from the aircraft. In yet another mode of use, the loader is aligned in tandem with another similar loader to form a two-vehicle ramp of lower slope gradient, for example, to accommodate loading and unloading of wheeled vehicles through the relatively high nose cargo opening of a commercial transport airplane.

Preferably, retraction and extension motion of the leg assemblies is based on the principle of a four-bar linkage. More particularly, each leg assembly preferably includes left and right lower legs that are wheeled at their lower ends and are pivotably coupled at their upper ends to a generally panel-like upper cross-member which is pivotably coupled to the loader body and forms an upper main link of the four-bar linkage. Upper extensions of the lower legs are pivotably connected to auxiliary or control links which connect the leg extensions to the loader body to complete the four-bar linkage and constrain the leg assemblies to move along predetermined motion paths during deployment and retraction. The four-bar linkage configuration and the points of connection are such that the upper cross-members retract by swinging upwardly toward the midportion of the loader platform while the lower legs swing upwardly beside them. During such retraction with the loader platform in a horizontal position and, conversely, during leg extension, the wheeled lower ends of the lower legs move along nearly vertical motion paths such that there is a minimum of relative fore and aft travel of the wheels on the ground as the loader is being raised or lowered in the manner of an elevator.

In another aspect of the invention, the panel-like upper cross-members of the leg assemblies form horizontal bearing pads with the leg assemblies retracted enabling the fully folded loader to slide along the cargo deck of the airplane on conventional cargo casters or rollers provided in the cargo deck.

These and other features and advantages of the present invention will be apparent by reference to the accompanying drawings and the following detailed description of the preferred embodiment.

DETAILED DESCRIPTION OF THE PREFERRED EMBODIMENT

Figure 1:
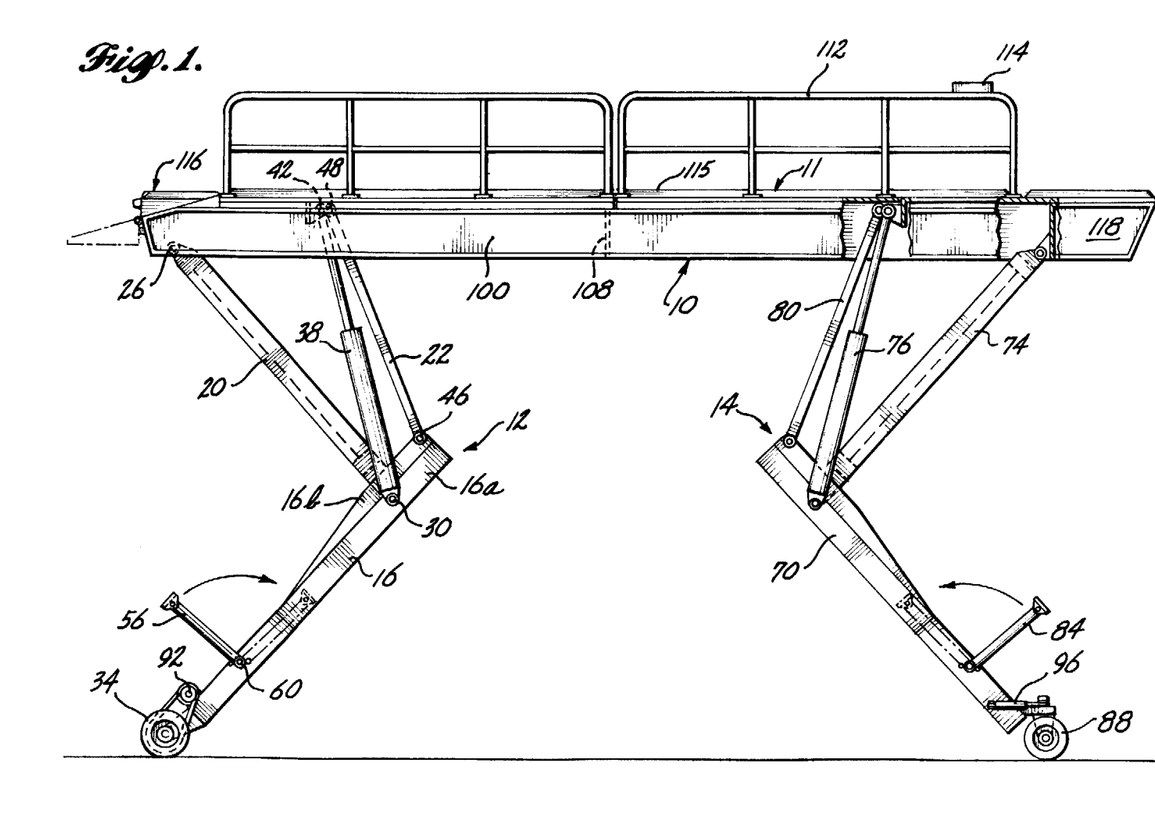
FIG. 1 is a side view of the preferred embodiment of the air transportable cargo loader of the present invention in a fully raised position.
Figure 2:
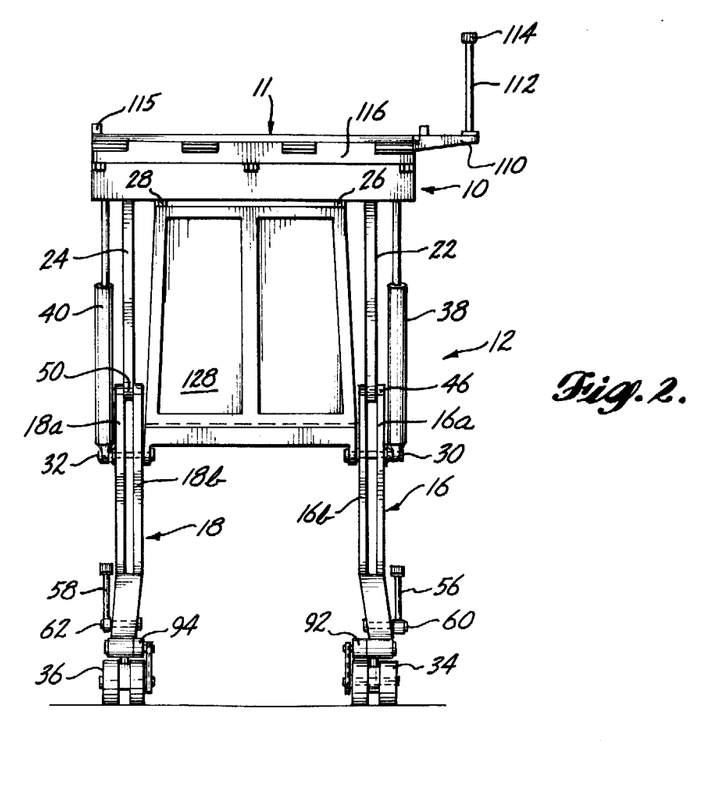
FIG. 2 is a front end view of the cargo loader in the position illustrated in FIG. 1.
Figure 3:
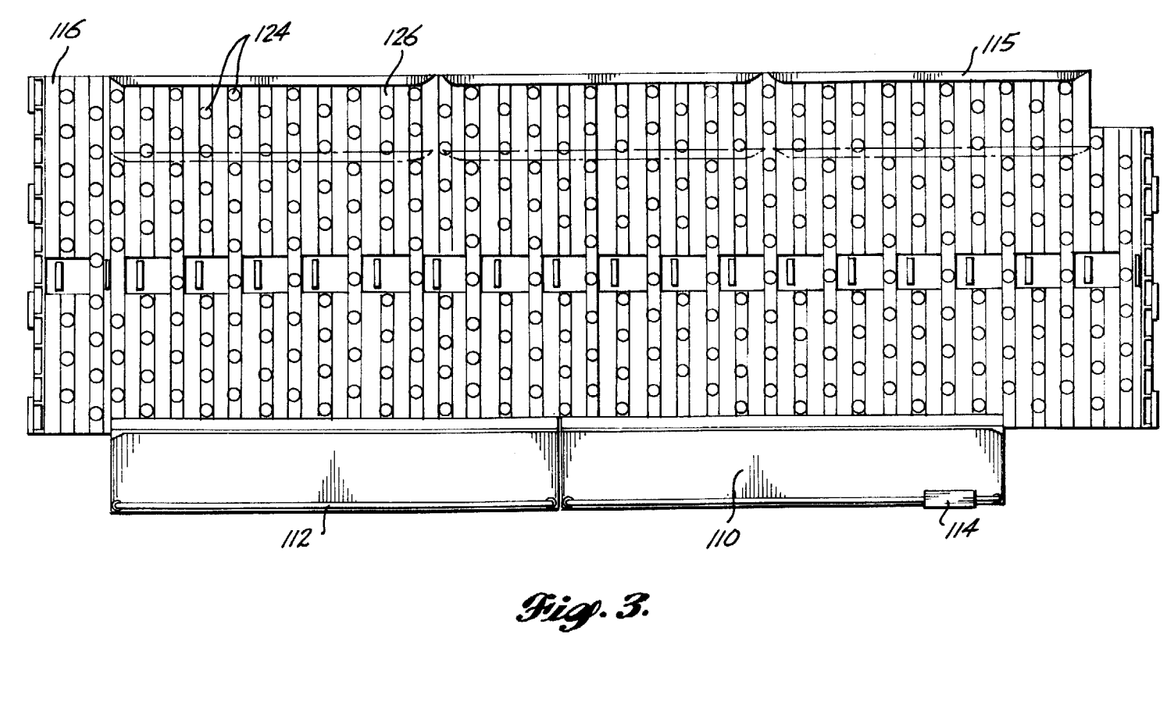
FIG. 3 is a plan view of the cargo loader of FIGS. 1 and 2.

Referring particularly to FIGS. 1 through 3, the preferred embodiment of the air cargo loader is illustrated in a deployed, fully raised position. To indicate the scale of the drawings, the illustrated loader as it is adapted for use with a Boeing 747 commercial transport airplane is approximately sixteen feet high and thirty feet long.

The cargo loader includes an elongate, generally rectangular platform body 10 having a substantially planar upper surface forming a cargo deck 11. Outboard and inboard foldable articulated leg assemblies 12 and 14 are coupled to the outboard and inboard ends of the loader body 10. The leg assemblies 12 and 14 are substantially identical in structure and function and will be described below primarily by reference to the outboard leg assembly 12. The leg assemblies 12 and 14 are each independently positionable between a fully extended position (illustrated in FIGS. 1 and 2), wherein they support the loader body 10 at a level sufficiently high to serve the various cargo doorways of an airplane, and a retracted position (shown in FIGS. 4 through 6) wherein the leg assemblies 12 and 14 are folded against the underside of the loader body so as to enable the cargo loader to rest flat on the cargo deck of an airplane.

Referring to FIGS. 1 and 2, the outboard leg assembly 12 includes left and right legs 16 and 18, respectively. The legs 16 and 18 are pivotably connected to a generally rectangular cross-member 20 that forms the upper main link of each of two four-bar linkages which include the cross-member 20, the legs 16 and 18, the loader body 10, and a pair of left and right auxiliary links 22 and 24, respectively.

The cross-member 20 is pivotably connected at one end by coaxial pivot pins 26 and 28 to the outboard end of the loader body 10 for relative pivotal motion about a substantially horizontal axis of rotation extending transversely with respect to the longitudinal axis of the loader body 10. The opposite end of the cross-member 20 is pivotably connected by coaxial pivot pins 30 and 32 to the left and right legs 16 and 18, respectively. The common axis of pivot pins 30 and 32 is substantially parallel to the common axis of pivot pins 26 and 28 such that the legs 16 and 18 are generally pivotable about the pins 30 and 32 through vertical planes extending parallel to the longitudinal axis of the loader body 10.

The cross-member 20 provides lateral stability to the loader and, with the legs fully retracted, also forms a bearing pad for stowage of the loader on a conventional airplane cargo deck having cargo casters, as described further below. Sets of wheels 34 and 36 are journalled to the lower ends of the legs 16 and 18, respectively.

The outboard end of the loader is raised and lowered by means of matched left and right linear hydraulic piston and cylinder actuators 38 and 40 which operate conjointly to extend and retract the leg assembly 12. The actuator 38 is pivotably coupled at its lower end to an outside extension of the pivot pin 30 connecting the cross-member 20 to the leg 16. It will be noted that with the linear actuator 38 coupled to the projection of pin 30 on the outside of the leg 16, that is, with the leg 16 sandwiched between the linear actuator 38 and the cross-member 20 such that the leg 16 when retracted can be drawn fully up against the loader body without interference from the actuator 38. The opposite end of the hydraulic actuator 38 is pivotably coupled by a pivot pin 42 to the loader body 10 at a point near its left edge and spaced longitudinally inward from the pivot pin 26 for cross-member 20.

The right-hand linear actuator 40 is similarly mounted at the opposite side of the loader body. It is coupled at one end to an outside extension of the pivot 32 connecting the cross-member 20 to the right leg 18, and is pivotably connected at its opposite end to the loader body 10 by a pivot pin 44.

The left-hand auxiliary link 22 is pivotably coupled at one end to an upper extension 16a of the left leg 16 by a pivot pin 46, and is pivotably connected at its opposite end to the side of the loader body 10 by a pivot pin 48 located nearly in alignment with pin 42. The pin 46 pivotably connects the lower end of the auxiliary link 22 between the ends of a pair of integral ribs 16b formed along the leg 16. The purpose of the ribs 16b is to form an integral slot into which the auxiliary link 22 is received when the leg assembly 12 is folded upwardly against the underside of the loader body 10.

Likewise, the right auxiliary link 24 is pivotably connected by a pivot pin 50 an extension portion 18a of the right leg 18 and in retraction is positionable between a pair of integral ribs 18b formed in the upper end of the right leg 18. The opposite end of the auxiliary link 24 is pivotably connected to the loader body 10 by a pivot pin 52.

A pair of normally retracted prop-like stops 56 and 58 are pivotably connected by pivot pins 60 and 62 to the legs 16 and 18, respectively. The stops 56 and 58 when extended bear upwardly against the loader body 10 so as to support the same with the leg assembly 12 in a partly folded position with the cargo deck 11 of the loader at a standard truck-bed height for loading cargo from conventional tractor/trailer transport vehicles (as illustrated in phantom outline in FIG. 10). The stops 56 and 58 when retracted lie folded against the legs 16 and 18 so as to permit the leg assembly 12 to be fully retracted against the loader body for stowage on an airplane.

The inboard leg assembly 14 is substantially identical to the leg assembly 12 and includes left and right legs 70 and 72 pivotably coupled to a rectangular cross-member 74, left and right linear hydraulic actuators 76 and 78, and left and right auxiliary links 80 and 82. The legs 70 and 72 include foldable stops 84 and 86, respectively. Rear wheels 88 and 90 are journalled to the lower ends of the legs 70 and 72.

The particular configuration of the four-bar linkage forming the leg assemblies 12 and 14 was selected because it results in the wheels 34 and 36 (and 88 and 90) travelling along substantially vertical paths with respect to the loader body 10 as the leg assemblies 12 and 14 are extended and retracted with the body 10 held horizontally. This feature enables the loader to be raised and lowered as an elevator with a minimum of fore and aft travel of the wheels on the ground.

The outboard sets of wheels 34 and 36 are provided with hydraulic motors 92 and 94 and associated belt or chain drives for propelling the cargo loader on the ground. The inboard wheels 88 and 90 are steerable by means of linear hydraulic steering actuators 96 and 98. The propulsion motors 92 and 94 and steering actuators 96 and 98 are powered either by a self-contained power unit aboard the loader (further described below) or by electrical power supplied from the airplane via a power cable.

Figure 4:
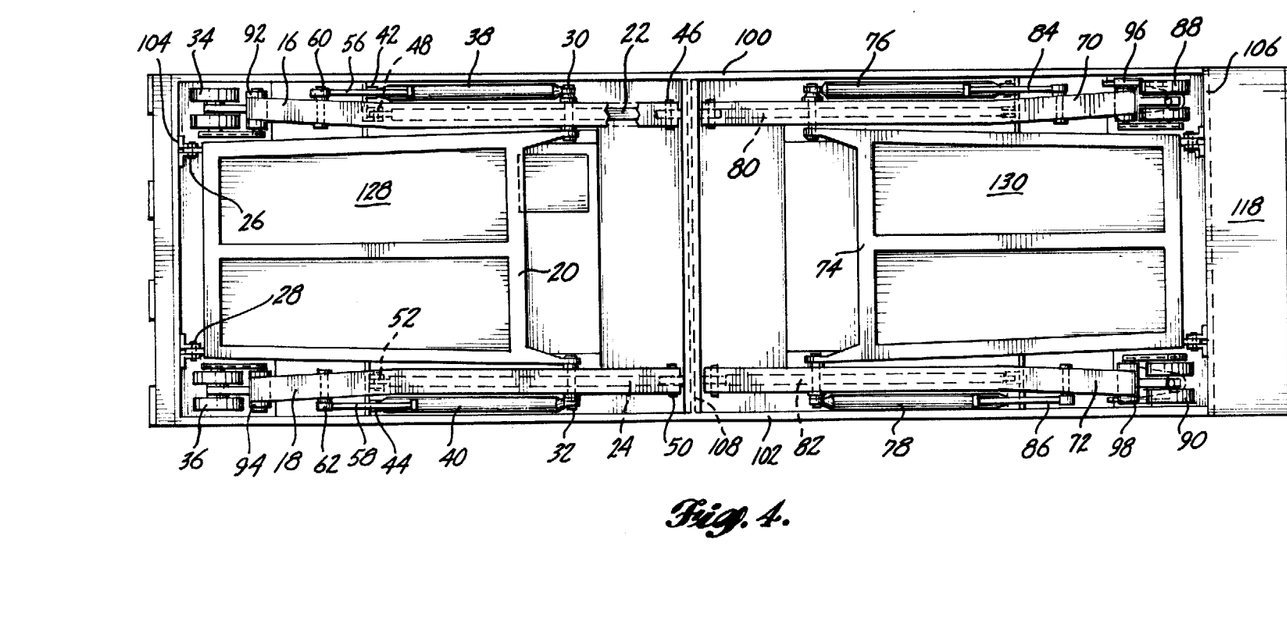
FIG. 4 is a bottom view of the cargo loader in a fully folded position for stowage aboard an airplane.
Figures 5, 6:
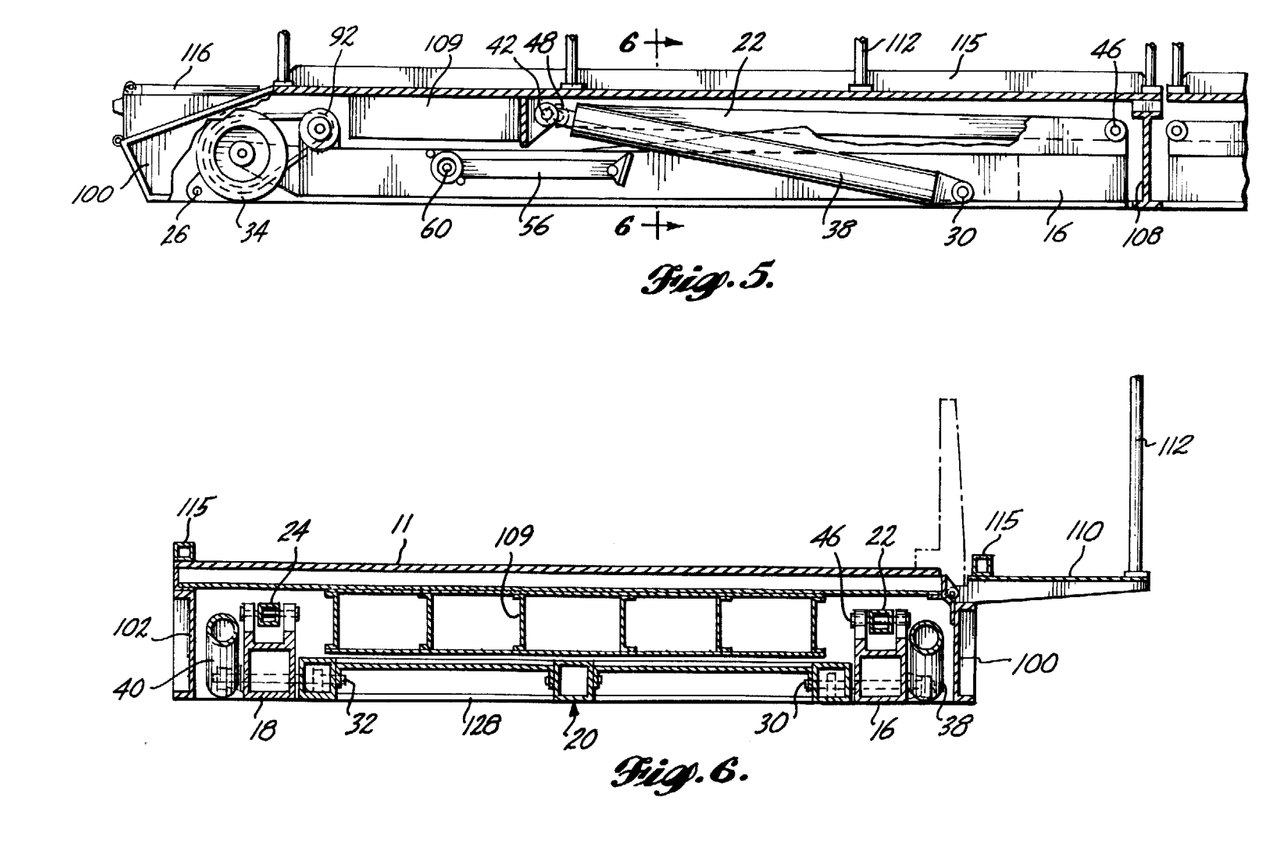
FIG. 5 is a side view in partial cross section of the cargo loader in the folded position of FIG. 4.
FIG. 6 is an end cross-sectional view taken along section line 6—6 of FIG. 5 of the loader body of the cargo loader.

Referring particularly to FIGS. 4 through 6, the loader body 10 is formed of left and right side beams 100 and 102, forward and rear end crossbeams 104 and 106, respectively, and a center crossbeam 108. A set of torque box beams 109 (shown in FIG. 6) are affixed to the underside of the cargo deck 11 to provide structural rigidity. A foldable catwalk 110 and attached guardrail 112 is pivotably connected to the left-hand side of the loader body 10. The catwalk 110 is foldable into a more compact, upright position (shown in phantom in FIG. 6) for stowage aboard the airplane. An operator's control terminal 114 is located at the rear end of the guardrail 112. Side rails 115 are provided at each side of the cargo deck 11.

A toe ramp 116 is hinged to the outboard end of the loader body 10. The toe ramp 116 is triangular in cross section so as to be deployable in either of two positions; a retracted position wherein the toe ramp 116 is folded against the loader body 10 to form a planar support surface continuous with the upper cargo deck 11 of the loader body, and a deployed position (shown in phantom outline in FIG. 1) wherein the toe ramp is swung outwardly to form a ramp whereby conventional wheeled and tracked vehicles can be rolled onto and off of the loader.

Figure 9:
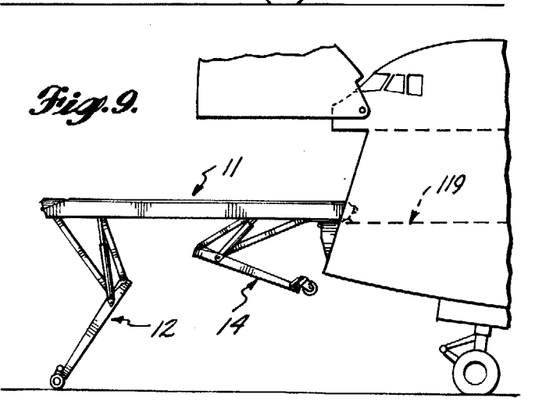
FIG. 9 illustrates the cargo loader being supported at its inboard end by the edge of the airplane cargo deck as the inboard leg assembly is deployed downwardly.

Referring again to FIG. 1, it will be noted that the outboard leg assembly 12 is generally connected to the loader body 10 as far forward as possible, whereas the rear leg assembly 14 is spaced inwardly from the inboard end of the loader body. This enables the inboard end of the loader body 10 to be supported on the edge of a cargo deck in a doorway of an airplane while the inboard leg assembly 14 is deployed or retracted, as illustrated in FIG. 9. Also, spacing the inboard leg assembly 14 from the end of the loader provides room for an engine compartment 118 in the rear end of the loader body 10, wherein are contained a power supply, fuel tank and associated control equipment.

Figure 7:
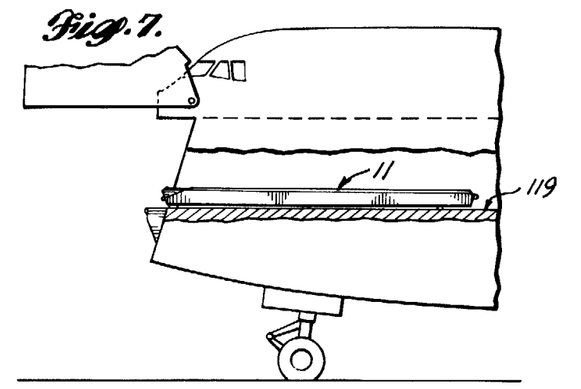
FIG. 7 is an illustration of the air cargo loader as stowed on the cargo deck of a commercial transport airplane in preparation for deployment from a nose cargo door.

The operation of the cargo loader of the present invention is illustrated in FIGS. 7 through 12. In FIG. 7, the cargo loader is illustrated as it is stowed in the nose of a transport airplane. It will be noted that the cargo loader, although it occupies a substantial area on the cargo deck inside the airplane, lies flat on the airplane cargo deck so that it is capable of supporting cargo on its own cargo deck while being transported. Although the loader is illustrated as being stowed adjacent the nose cargo door of the airplane, it should be understood that the loader can be moved about and stowed anywhere on the cargo deck of the airplane.

Figure 8:
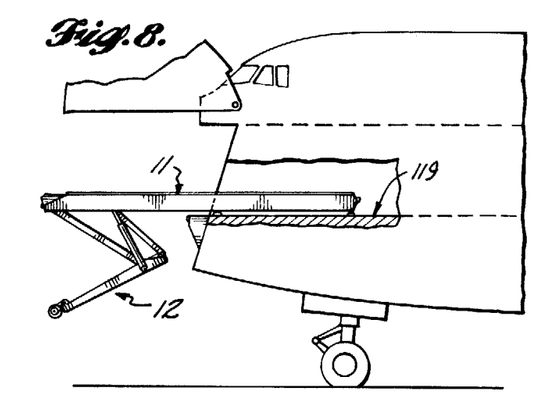
FIG. 8 illustrates the cargo loader partially extended through the nose cargo doorway, with the outboard leg assembly being deployed downwardly.
Figure 10:
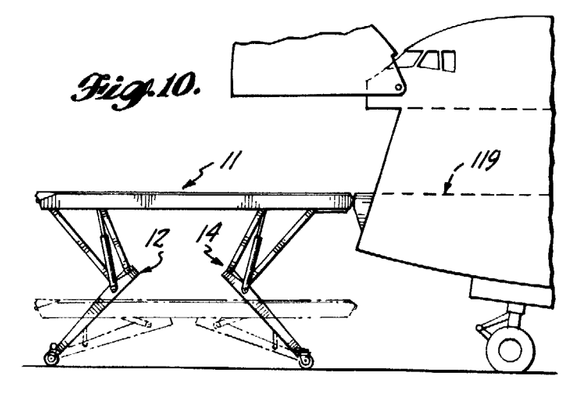
FIG. 10 illustrates the cargo loader fully deployed from the airplane and ready for cargo loading operations.

FIG. 8 shows the cargo loader in the intial stages of deployment from the airplane. The cargo loader is slid forward out of the nose cargo opening of the airplane until it is extended almost halfway beyond the edge of the cargo deck. The outboard leg assembly 12 is then lowered to the ground to support the outboard end of the loader. The loader is then slid further forward until the inboard end of the loader is supported on the edge of the cargo deck, as illustrated in FIG. 9. The inboard leg assembly 14 is then deployed downwardly until the cargo loader is fully supported on the outboard and inboard leg assemblies 12 and 14, as shown in FIGS. 9 and 10. The cargo loader may then be rolled forward under its own power and lowered slightly, to the position shown in FIG. 10, to bring the level of the loader deck 11 to the level of the airplane deck 119 so that cargo can be slid or wheeled from the airplane onto the loader.

During loading and unloading of cargo, the cargo loader may be utilized in the manner of an elevator, that is, raising and lowering the loader by synchronous operation of the inboard and outboard leg assemblies so as to maintain the cargo deck 11 in a horizontal position. However, as this process requires repeated raising and lowering of the cargo loader and is therefore somewhat time-consuming, cargo, particularly cargo consisting of wheeled or tracked vehicles, may be more efficiently loaded onto or off of the airplane in the manners illustrated in FIGS. 11 and 12.

Figure 11:
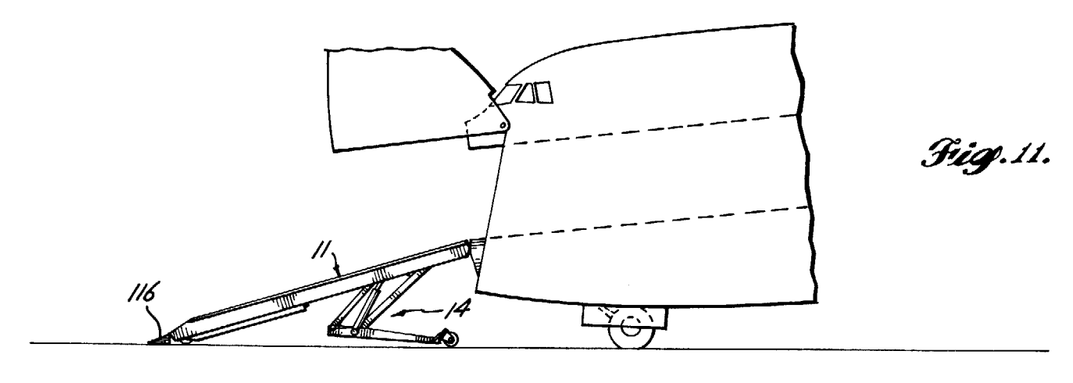
FIG. 11 illustrates the cargo loader deployed to form a ramp extending from the nose cargo door of a commercial transport airplane having a kneelable nose landing gear assembly.

FIG. 11 illustrates the use of a single cargo loader deployed as a ramp in combination with a transport airplane having a kneelable nose landing gear. The toe ramp 116 is deployed to permit tracked or wheeled vehicles to drive under their own power into or out of the airplane.

Figure 12:
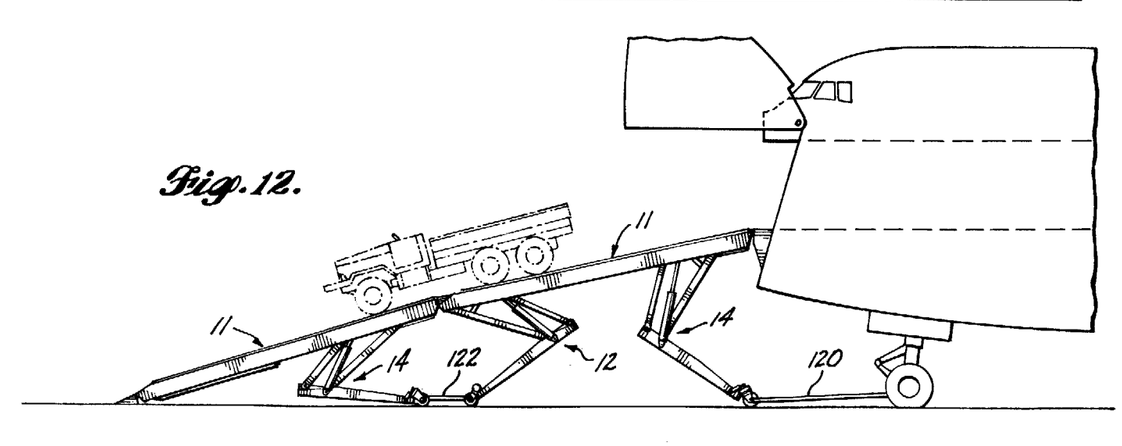
FIG. 12 illustrates two cargo loaders deployed in series to form a ramp extending from the nose cargo door of a conventional commercial transport airplane.

FIG. 12 illustrates a pair of cargo loaders coupled in tandem so as to form a ramp of relatively lower slope gradient from an airplane of conventional height by which wheeled or tracked vehicles may enter or exit the airplane under their own power. A loading boom 120 secures the inboard end of the loader to the landing gear of the airplane. A second boom 122 connects the two loaders.

Figure 13:
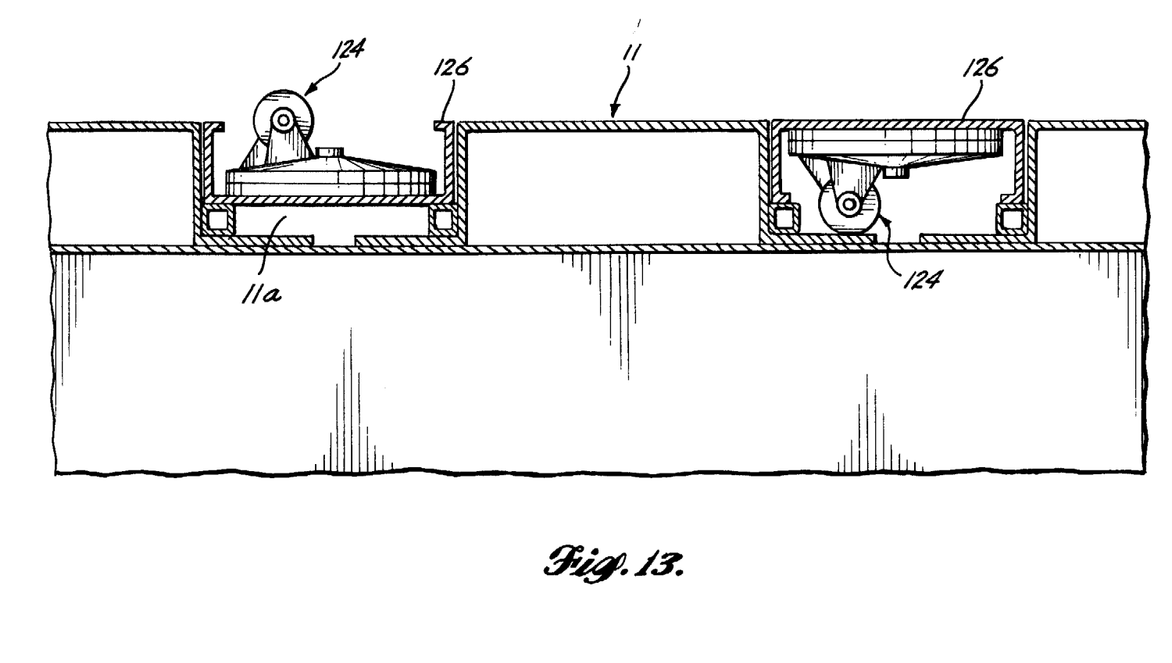
FIG. 13 is a cross section of the deck of the cargo loader, illustrating the reversible cargo casters in their upturned and concealed positions.

Referring to FIGS. 3 and 13, the deck 11 of the cargo loader is preferably provided with conventional cargo casters 124 of the type typically employed on cargo decks of commercial transport airplanes. The cargo casters 124 are supported in reversible caster trays 126 which fit into cooperable transverse slots 11a in the cargo deck 11 of the loader. The cargo trays 126 may be positioned with the casters 124 facing upwardly so that cargo may be easily moved about on the loader (as shown on the left in FIG. 13), or they may be turned over to conceal the casters and form a substantially planar bearing surface to accommodate wheeled vehicles (as shown on the right in FIG. 13).

The cross-members 20 and 74 of the leg assemblies 12 and 14 are provided with flat inset panels 128 and 130 which form substantially planar bearing pads when the leg assemblies 12 and 14 are folded into their retracted positions. The inset panels 128 and 130 thereby enable the cargo loader to be stowed on an airplane cargo deck having conventional cargo casters or rollers, such that the cargo loader may be moved about as desired within the cargo hold of the airplane.

The loader is capable of serving any of the cargo doors of a commercial transport airplane, including nose and side doors, as well as lower lobe doors on the underside of the fuselage. The loader can be readily moved from one door to another. The illustrated embodiment of the loader can be raised to its full height in 30 to 60 seconds.

Although the present invention is described and depicted by reference to a preferred embodiment, it will be understood that various modifications, alterations and substitutions that may be apparent to one of ordinary skill in the art may be made without departing from the spirit of the invention. Accordingly, the scope of the invention is defined by the following claims.

The embodiments of the invention in which an exclusive property or privilege is claimed are defined as follows:

1. An air transportable, self-contained aircraft cargo loader, comprising a cargo platform having opposite inboard and outboard ends with foldable wheeled leg assemblies supportively connected to said platform beneath said respective ends, the leg assembly at each platform end being movable between a folded position wherein said leg assembly is retracted to lie compactly against said platform through a range of extended positions to a fully extended position wherein said leg assembly projects generally downwardly from said platform, wheel means journalled to said leg assemblies operable to support said platform on the extended leg assemblies, and means constraining the leg assemblies to move along predetermined motion paths during extension and retraction, said motion paths for the wheel means of the leg assemblies extending generally in a substantially vertical line relative to the platform with the platform in a substantially horizontal position, said leg assemblies being dimensioned to position the platform substantially at cargo deck level of an airplane with the leg assemblies at least partially extended, independently operable power actuation means for the respective leg assemblies for extending and retracting each independently of the other and adapted for conjoint operation to extend and retract said leg assemblies substantially synchronously, the inboard end of the platform being adapted in conjunction with the inboard leg assembly so as to permit the platform to be advanced over the cargo deck of the airplane and to be lowered onto the same whereby with the inboard leg assembly retracted and the inboard platform end resting on the airplane cargo deck and the outboard leg assembly extended to the ground the loader thus supported can be slid inwardly and outwardly of the airplane, and whereby with the platform still so supported and approaching full withdrawal from the cargo deck the inboard leg assembly may also be extended to the ground, and whereby with the platform resting on the cargo deck and with the inboard leg assembly retracted and inside the airplane the outboard leg assembly may be retracted for full insertion and stowage of the loader inside the airplane, and further whereby with the loader fully withdrawn from the airplane the platform may be raised and lowered in the manner of an elevator by synchronous extension and retraction movement of the leg assemblies while maintaining the platform substantially horizontal and may alternatively be positioned with the inboard and outboard ends at different heights to enable the loader to be employed as a loading ramp.

2. The air transportable aircraft cargo loader defined in claim 1 wherein said leg assemblies each include an upper portion pivotally connected to the respective end of said platform to swing between a fully retracted position extending toward the opposite end substantially parallel to the platform and a fully extended position projecting generally downwardly from the platform, and a lower portion pivotally connected to said upper portion to swing thereon between a fully retracted position substantially parallel with said upper portion and a fully extended position projecting generally downwardly therefrom, said wheel means being journalled to said lower portions of said leg assemblies.

3. The air transportable aircraft cargo loader defined in claim 2 wherein said lower portion of each of said inboard and outboard leg assemblies includes left and right spaced-apart legs each having first and second ends, said wheel means being journalled to said first ends of said legs, said upper portion of each of said leg assemblies including a rigid cross-member pivotally coupled for swinging motion to the respective end of said platform and pivotally coupled at its opposite end to said second ends of said legs of said leg assembly, said means constituting the leg assemblies to move along predetermined motion paths including in each leg assembly a pair of auxiliary links coupled respectively to said legs, each auxiliary link being pivotally coupled at one end to said platform and pivotally coupled at its opposite end to an extension portion of said second end of the respective leg, whereby said cross-member and said extension portions of said legs and said auxiliary links and said platform form a pair of four-bar linkages connected in parallel by said cross-member whereby said wheel means of said inboard and outboard leg assemblies undergo a minimum of mutual relative fore and aft travel during synchronous retraction and extension of said leg assemblies with said platform maintained substantially horizontally.

4. The air transportable aircraft cargo loader defined in claim 3 wherein said independently operable power actuation means includes linear hydraulic actuators coupled respectively to said legs of said leg assemblies, each actuator being pivotally connected at one end to said platform and pivotally connected at its opposite end to said second end of the respective leg.

5. The air transportable cargo loader defined in claim 3 wherein said cross-members of said leg assemblies include substantially planar inset panels which form downwardly facing bearing pad surfaces when said leg assemblies are retracted into said folded position, whereby the air cargo loader may be stowed on a conventional airplane cargo deck having cargo caster means.

6. The air transportable aircraft cargo loader defined in claim 1, 2, 3, 4 or 5 wherein said inboard leg assembly is spaced from said inboard end of said platform toward said outboard end of said platform, whereby said inboard end of said platform may be supported by the edge of the airplane cargo deck during retraction and extension of said inboard leg assembly.

7. The air transportable cargo loader defined in claim 3, 4 or 5 wherein each of said legs of said outboard and inboard leg assemblies includes a foldable stop pivotably connected to said leg for supporting said platform at a predetermined height.

8. The air transportable cargo loader defined in claim 3, 4 or 5 further comprising propulsion means coupled to said wheel means of said outboard leg assembly, and wherein said wheel means of said inboard leg assembly is steerable and is coupled to steering means for steering said cargo loader.

9. The air transportable cargo loader defined in claim 6, further comprising a toe ramp hinged to the outboard end of said platform, said toe ramp being deployable between a first position wherein said toe ramp forms a continuous extension of the upper surface of said platform and a second position wherein said toe ramp is swung pivotably outwardly to form a ramp by which vehicles may drive onto or off of the platform with the outboard end of said platform adjacent the ground.

10. The air transportable cargo loader defined in claim 1 wherein said leg assemblies include integral planar portions that form substantially horizontal bearing pads with said leg assemblies in said folded position, whereby the loader may be supported by conventional cargo caster means on a cargo deck of an airplane with both leg assemblies retracted.

11. An air transportable, self-contained aircraft cargo loader, comprising a cargo platform having opposite inboard and outboard ends with articulated foldable wheeled leg assemblies supportively connected to said platform beneath said respective ends, the leg assembly at each platform end including an upper portion pivotally connected to the platform to swing between a fully retracted position extending toward the opposite end substantially parallel to the platform and an extended position projecting generally downwardly from the platform, a lower portion pivotally connected to the upper portion to swing thereon between a fully retracted position substantially parallel with said upper portion and a fully extended position projecting generally downwardly therefrom, wheel means journalled to said lower portion and operable to support the extended leg assembly, and control linkage means connected with the platform defining a predetermined motion path for such leg assembly during extension and retraction movement of the leg assembly relative thereto, said motion path for the wheel means of the leg assembly extending generally in a vertical line relative to the platform with the platform in a substantially horizontal position, said leg assemblies being dimensioned to position the platform substantially at cargo deck level of an aircraft with the leg assemblies at least partially extended, independently operable power actuation means for the respective leg assemblies for extending and retracting each independently of the other and adapted for conjoint operation to extend and retract said leg assemblies substantially synchronously, the inboard end of the platform being adapted in conjunction with the inboard end leg assembly so as to permit the platform to be advanced over the cargo deck of the aircraft and to be lowered onto the same whereby with the inboard end leg assembly retracted and the inboard end resting on the airplane cargo deck and the outboard end leg assembly extended to the ground the vehicle thus supported can be slid inwardly and outwardly of the airplane, and whereby with the platform still so supported and approaching full withdrawal from the cargo deck the inboard leg assembly may also be extended to the ground, and whereby with the platform resting over a major portion of its length on the cargo deck with the inboard leg assembly retracted the outboard end leg assembly may be retracted for full insertion and stowage of the loader inside the airplane, and further whereby with the loader fully withdrawn from the airplane the platform may be raised and lowered in the manner of an elevator by synchronous extension and retraction movement of the leg assemblies while maintaining the platform substantially horizontal and may alternatively be positioned with the inboard and outboard ends at different selected heights to enable the loader to be employed as a loading ramp.

12. The air transportable aircraft cargo loader defined in claim 11 wherein said inboard leg assembly is spaced from said inboard end of said platform toward said outboard end of said platform, whereby said inboard end of said platform may be supported by the edge of the aircraft cargo deck during retraction and extension of said inboard leg assembly.

13. The air transportable aircraft cargo loader defined in claim 12 wherein said lower portion of each of said inboard and outboard leg assemblies includes left and right spaced-apart legs each having first and second ends, said wheel means being journalled to said first ends of said legs, said upper portion of each of said leg assemblies including a rigid cross-member pivotally coupled for swinging motion to the respective end of said platform and pivotally coupled at its opposite end to said second ends of said legs of said leg assembly, said control linkage means including a pair of auxiliary links pivotally coupled at their opposite ends to said platform and to extension portions of said second ends of said legs, whereby said cross-member and said extension portions of said legs and said auxiliary links and said platform form a four-bar linkage, whereby said wheel means undergo a minimum of mutual relative fore and aft travel during synchronous retraction and extension of said leg assemblies with said platform maintained substantially horizontally.

14. The air transportable aircraft cargo loader defined in claim 13 wherein said independently operable power actuation means includes linear hydraulic actuators coupled respectively to said legs of said leg assemblies, each actuator being pivotally connected at one end to said platform and pivotally connected at its opposite end to said second end of the respective leg.

15. The air transportable cargo loader defined in claim 13 or 14 wherein said cross-members of said leg assemblies include substantially planar inset panels which form said downwardly facing bearing surface when said leg assemblies are retracted, whereby the air cargo loader may be stowed on a conventional airplane cargo deck having cargo caster means.

16. The air transportable cargo loader defined in claim 15 wherein each of said legs of said outboard and inboard leg assemblies includes a foldable stop pivotably connected to said leg for supporting said platform at a predetermined height.

17. The air transportable cargo loader defined in claim 11, 12, or 13 further comprising propulsion means coupled to said wheel means of said outboard leg assembly, and wherein said wheel means of said inboard leg assembly is steerable and is coupled to steering means for steering said cargo loader.

18. The air transportable cargo loader defined in claims 11, 12 or 13 further comprising a toe ramp hinged to the outboard end of said platform said toe ramp being deployable between a first position wherein said toe ramp forms a continuous extension of the upper surface of said platform and a second position wherein said toe ramp is swung pivotably outwardly to form a ramp by which vehicles may drive onto or off of the platform with the outboard end of said platform adjacent the ground.

19. The air transportable cargo loader defined in claim 11 wherein said upper portion of each of said leg assemblies includes an integral planar portion that forms a bearing pad for the loader with said leg assembly in said fully retracted position, whereby the loader may be supported by conventional cargo caster means on a cargo deck of an airplane.

* * * * *